United States Patent
McLaughlin et al.

(10) Patent No.: US 6,269,104 B1
(45) Date of Patent: Jul. 31, 2001

(54) LINK CONTROL STATE MACHINE FOR CONTROLLING A MEDIA ACCESS CONTROLLER, A SERIAL PHYSICAL LAYER DEVICE AND A MEDIA INDEPENDENT INTERFACE PHYSICAL LAYER DEVICE

(75) Inventors: Eric McLaughlin, Grass Valley; Mohammed Bustany, Rocklin; Mark C. Lucas, Auburn, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/063,723

(22) Filed: Apr. 21, 1998

(51) Int. Cl.$^7$ .................................................... H04J 15/00
(52) U.S. Cl. .................................................................. 370/464
(58) Field of Search ................................... 370/464, 230, 370/232, 233, 235, 347, 419, 437, 438, 442, 451, 469, 445, 447, 242, 241, 247, 248, 251, 252, 253, 353, 358, 359, 360, 362, 365, 398, 401, 402, 422, 439

(56) References Cited

U.S. PATENT DOCUMENTS

| | | | |
|---|---|---|---|
| 5,784,573 | * | 7/1998 | Szczepanek et al. ............... 370/250 |
| 5,991,303 | * | 11/1999 | Mills ...................................... 370/402 |
| 6,047,001 | * | 4/2000 | Kuo e tal. ............................ 370/428 |
| 6,055,241 | * | 4/2000 | Raza et al. ........................... 370/445 |
| 6,061,362 | * | 5/2000 | Muller et al. ........................ 370/463 |
| 6,067,585 | * | 5/2000 | Hoang ................................... 710/11 |

OTHER PUBLICATIONS

IEEE Standard 802.3u, 1995, Chapter 22 (pp. 27–80), 1995.
Preliminary Data Sheet, 8501/8502 Ethernet MII to AUI Interface Adapter, Seeq Technology, Inc. Jul. 14, 1997, pp. 1–56.

* cited by examiner

Primary Examiner—Dang Ton
Assistant Examiner—Phirin Sam

(57) ABSTRACT

A link control state machine controls a media access controller (MAC), a serial physical sublayer (serial PHY) and a media independent interface physical sublayer (MII PHY). In a first state of the link control state machine, an attempt is made to establish a link via the MII PHY. If successful, a second state is entered and the MAC performs data transfer using the MII PHY while the serial PHY is isolated from the MAC. In a third state, an attempt is made to establish a network link via a serial PHY. The MII PHY is isolated from the MAC and a test frame is sent using the serial PHY. The third state is entered from the first state when there is a link timeout on the MII PHY. In a fourth state, the MAC performs data transfer using the serial PHY. The fourth state is entered from the third state if the test frame was transmitted successfully.

19 Claims, 4 Drawing Sheets

LINK CONTROL STATE MACHINE FOR CONTROLLING A MEDIA ACCESS CONTROLLER, A SERIAL PHYSICAL LAYER DEVICE AND A MEDIA INDEPENDENT INTERFACE PHYSICAL LAYER DEVICE

BACKGROUND

The present invention concerns data transfer over a network and pertains particularly to a link control state machine for controlling a media access controller, a serial physical layer device and a media independent interface physical layer device.

The IEEE 802.3 specification has been created and adopted as a method of sending information between computers and other devices. The IEEE 802.3u specification extended the technology for 100 megabits per second networking.

Within the IEEE 802.3 specification a physical sublayer (PHY) includes a Physical Coding Sublayer (PCS), a Physical Media Access (PMA) sublayer, and a Physical Media Dependent (PMD) sublayer. The PCS defines how data is encoded and decoded as well as how the Carrier Sense (CS) and Collision Detection (CD) functions work. The PCS also defines the interface between higher and lower layers in the protocol specification. The PMA defines the mapping of code bits, generation of a control signal (link_status), generation of control signals to the PCS, and clock recovery. The control signal (link_status) indicates the availability of the PMD. The control signals to the PCS indicate Carrier Sense, Collision Detection and Physical Layer Errors. The PMD defines the signaling method and parameters for the various physical parameters that are necessary to address the link's physical requirements.

The PHY is generally placed on a dedicated integrated circuit (chip). The PHY communicates with a separate media access control (MAC) integrated circuit. The MAC provides an interface to a host system.

Some PHY chips provide connectivity for 10Base2 devices. For example, a PHY chip which provides connectivity to an attachment unit interface (AUI) (for 10Base2 connectivity) is available as part LXT908 from Level One Communications, Inc., having a business address of 9750 Goethe Road, Sacramento, Calif. 95827. PHYs which provide 10Base2 connectivity typically interface with a serial MAC chip.

With the advent of the IEEE 802.3u specification, some PHY chips provide connectivity to 10/100T networks. For example, a PHY chip which provides connectivity to 10/100 megabit networks is available as part LXT970 from Level One Communications, Inc. In order to connect a MAC chip to multiple PHY chips which can provide connectivity to 10/100 megabit networks or other types of media, a media independent interface (MII) bus was created. A PHY chip connected to an MII bus transmits to and receives data from a MAC chip in four bit groupings (nibbles) of data. For more information on construction of an MII bus, see Chapter 22 of the IEEE 802.3u specification Generally, to provide 10Base2 along with 10/100T connectivity, it is necessary utilize two separate MACs. However Seeq Technology Inc. having a business address of 47200 Bayside Pky, Fremont, Calif. 94538-6567 has designed a specialized 10Base2 PHY which can communicate with a MAC over an MII bus. However, this solution requires the use of a specialized 10Base2 PHY.

SUMMARY OF THE INVENTION

In accordance with the preferred embodiment of the present invention, a link control state machine controls a media access controller (MAC). The MAC is for connection to both a serial physical sublayer (serial PHY) and a media independent interface physical sublayer (MII PHY). In a first state of the link control state machine, the serial PHY is isolated from the MAC and the link status of the MII PHY is checked. In a second state, the MAC performs data transfer using the MII PHY and the serial PHY remains isolated from the MAC. The second state is entered from the first state when the check of the link status shows that a link is established. In a third state, the MII PHY is isolated from the MAC and a test frame is sent using the serial PHY. The third state is entered from the first state when there is a link timeout. In a fourth state, the MAC performs data transfer using the serial PHY. The fourth state is entered from the third state when the test frame was transmitted successfully.

In the preferred embodiment, when the link control state machine is in the first state, the serial PHY is isolated from the MAC, the MII PHY is selected, auto-negotiation is enabled and a timeout timer is started. Also, when the link control state machine is in the second state, the link status of the MII PHY is monitored.

Also in the preferred embodiment, when the link control state machine is in the second state and there is a link loss, the link control state machine transitions to the third state. When the link control state machine is in the third state, after the test frame is sent, status of the test frame is checked.

When the link monitor is in the third state, if there is a transmit error indicated by the status of the test frame, the link control state machine transitions to the first state. When the link control state machine is in the fourth state, link status of the MII PHY is checked. If a link is established by the MII PHY, the link control state machine transitions to the first state.

The present invention reduces the cost of providing for simultaneous support of 10BaseT, 100BaseT and 10 base 2 connectivity. A single network card with only one MAC chip can be designed to provide all three connection options. Any MII compatible PHY can be connected simultaneously with any serial PHY. By connecting two PHY chips to a single MAC chip, it is possible to save space and a printed circuit board, and to conserve power consumption. Since the present invention allows compatibility with any serial PHY, the present invention allows the use of any competitively priced 10Base2 PHY.

DESCRIPTION OF THE PREFERRED EMBODIMENT

Figure 1:
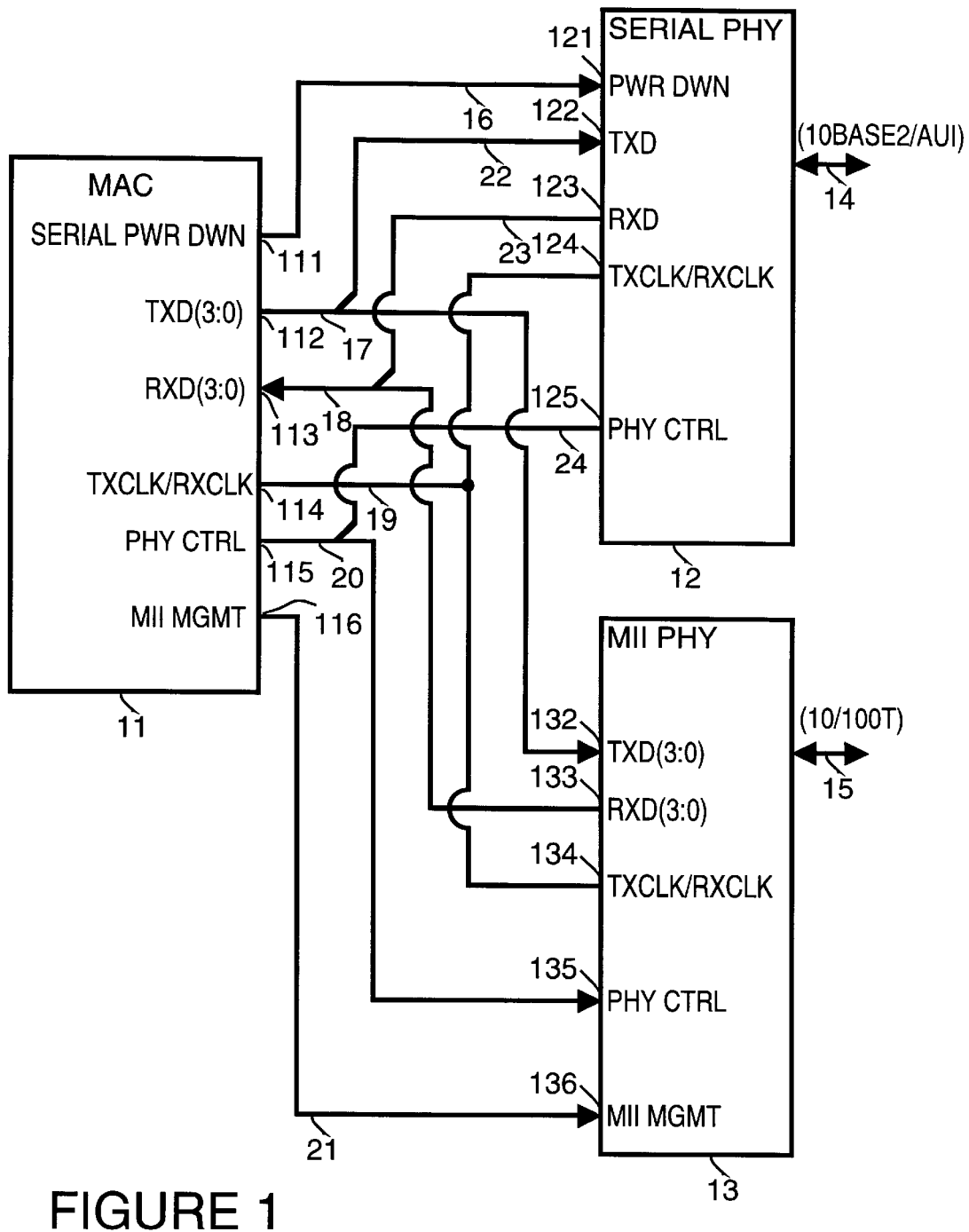
FIG. 1 is a simplified block diagram which shows a media access control (MAC) integrated circuit connected to one physical sublayer (PHY) through a media independent interface (MII) bus and to another PHY through a serial interface in accordance with a preferred embodiment of the present invention.

FIG. 1 is a simplified block diagram which shows a media access control (MAC) integrated circuit 11 connected to a serial physical sublayer (serial PHY) 12 and to a media independent interface physical sublayer (MII PHY) 13. Serial PHY 12 is a PHY chip which provides connectivity to an attachment unit interface (AUI) 14 (i.e., a 10Base2 port). For example, PHY 12 is a LXT908 PHY available from Level One Communications, Inc. Alternatively, serial PHY 12 is a serial PHY available from one of a number of other vendors.

Serial PHY 12 includes a power down (PWR DWN) input 121, a transmit data input 122, a receive data output 123, a receive clock/transmit clock 124 and physical control signal input/output (I/O) lines 125.

MII PHY 13 is a PHY chip which provides connectivity for an interface 15 which is 10T, 100T or another 10/100 megabit network. For example, MII PHY 13 is a LXT970 PHY available from Level One Communications, Inc. Alternatively, MII PHY 13 is an MII PHY available from one of a number of other vendors.

MII PHY 13 includes a four-bit transmit data input 132, a four-bit receive data output 133, a receive clock/transmit clock 134, physical control signal I/O lines 135, and an MII management port 136.

MAC 11 includes a serial power down output 111, a four-bit transmit data output 112, a four-bit receive data input 113, a receive clock/transmit clock 114, physical control signal input/output (I/O) 115 and MII management port 116.

Serial power down output 111 of MAC 11 is connected through line 16 to power down input 121 of serial PHY 12. Four-bit transmit data output 112 of MAC 11 is connected through lines 17 to four-bit transmit data input 132 of MII PHY 13. A single line 22 (TXD[0]) from lines 17 is split off and connected to transmit data input 122 of serial PHY 12.

Four-bit receive data input 113 of MAC 11 is connected through lines 18 to four-bit receive data output 133 of MuI PHY 13. A single line 23 (RXD[0]) from lines 18 is split off and connected to receive data output 123 of serial PHY 12. Receive clock/transmit clock 114 of MAC 11 is connected through lines 19 to receive clock/transmit clock 124 of serial PHY 12 and to receive clock/transmit clock 134 of Mll PHY 13.

Physical control signal I/O lines 115 of MAC 11 are connected through lines 20 to physical control signal I/O lines 135 of MII PHY 13. A subset of lines 24 of lines 20 are used to connect a subset of physical control signal I/O lines 115 of MAC 11 to physical control signal I/O lines 125 of serial PHY 12. MII management port 116 of MAC 11 is connected through line 21 to MII management port 136 of MII PHY 13.

In essence then, MAC 11 presents an MII interface to MII PHY 13. Using a subset of the MII interface, MAC 11 presents a serial interface to serial PHY 12.

Table 1 below sets out the MII signals and shows which of the MII signals are connected to and used by serial PHY 12.

TABLE 1

| MII Signals | Serial PHY Signals |
|---|---|
| MDIO | Not Connected |
| MDC | Not Connected |
| RXD[3] | Not Connected |
| RXD[2] | Not Connected |
| RXD[1] | Not Connected |
| RXD[0] | RXD |

TABLE 1-continued

| MII Signals | Serial PHY Signals |
|---|---|
| RX_DV | Not Connected |
| RX_CLK | RXCLK |
| RX_ER | Not Connected |
| TX_ER | Not Connected |
| TX_CLK | TXCLK |
| TX_EN | TXEN |
| TXD[0] | TXD |
| TXD[1] | Not Connected |
| TXD[2] | Not Connected |
| TXD[3] | Not Connected |
| COL | COL |
| CRS | CD |

Figure 2:
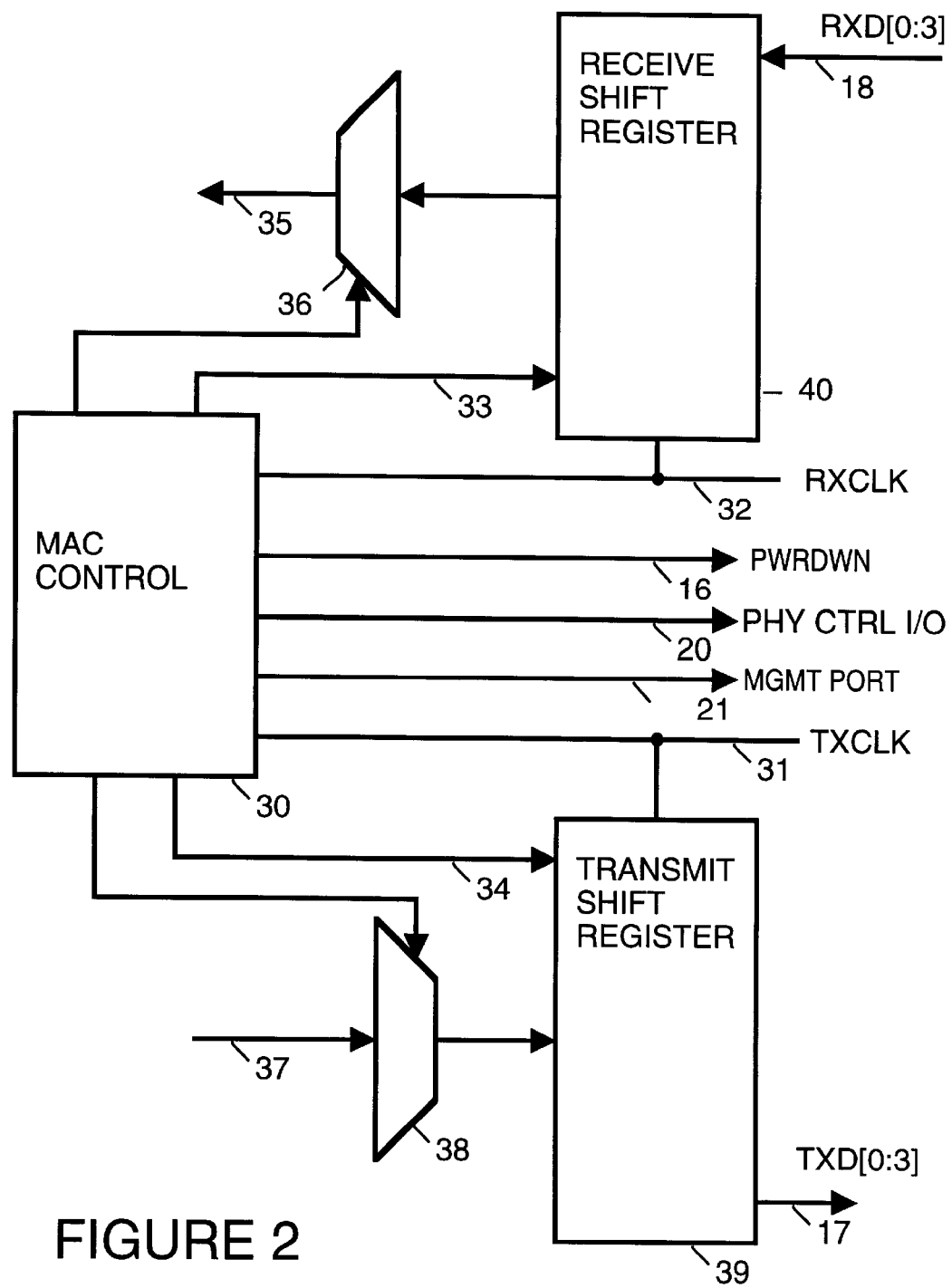
FIG. 2 is a simplified block diagram which shows an interface within the media access control integrated circuit shown in FIG. 1 in accordance with a preferred embodiment of the present invention.

FIG. 2 is a simplified block diagram which shows an interface within the MAC integrated circuit 11. To allow serial PHY 12 to be connected to the MII interface presented by MAC 11, MAC 11 must be able to isolate serial PHY 12 from the MII bus. MAC 11 also must be capable of handling different clock speeds and different data widths.

As shown by FIG. 2, within MAC 11, the receive and transmit channels are split into different sections. On the receive path, data is received into a receive shift register 40. RXCLK on a line 32 is used to clock receive shift register 40. Through a control line 33, MAC control 30 controls receive shift register 40. When receiving data from serial PHY 12, each clock signal clocks into receive shift register 40 one bit of data. When receiving data from MII PHY 13, each clock signal clocks into receive shift register 40 four bits of data. When receive shift register 40 has received a full byte of data, gate 36 forwards the byte of data into data path 35 of MAC 11 for further processing.

On the transmit path, eight bits of data are received from a data path 37 of MAC 11 into a transmit shift register 39 via a gate 38 controlled by Mac control 30. TXCLK on a line 31 is used to clock transmit shift register 39. Through a control line 34, MAC control 30 controls transmit shift register 39. When transmitting data to serial PHY 12, each clock signal clocks out of transmit shift register 39 one bit of data. When transmitting data to MII PHY 13, each clock signal clocks out of transmit shift register 39 four bits of data.

When operating in serial mode, TXCLK and RXCLK operate at 10 MHz. When operating in MII mode, TXCLK and RXCLK operate at 2.5 MHz (for 10T connections) or 25 MHz (for 100T connections).

MAC control 30 controls the mode in which MAC 11 operates. MAC control 30 takes advantage of power down (PWR DWN) input 121 of serial PHY 12 to isolate serial PHY 12 from the MII bus when MAC 11 is communicating with MII PHY 13. If there is no power down/tri-state capability in serial PHY 12, it is necessary to, in some other way, isolate serial PHY 12 from MAC 11 when performing data transactions with MII PHY 13.

Figure 3:
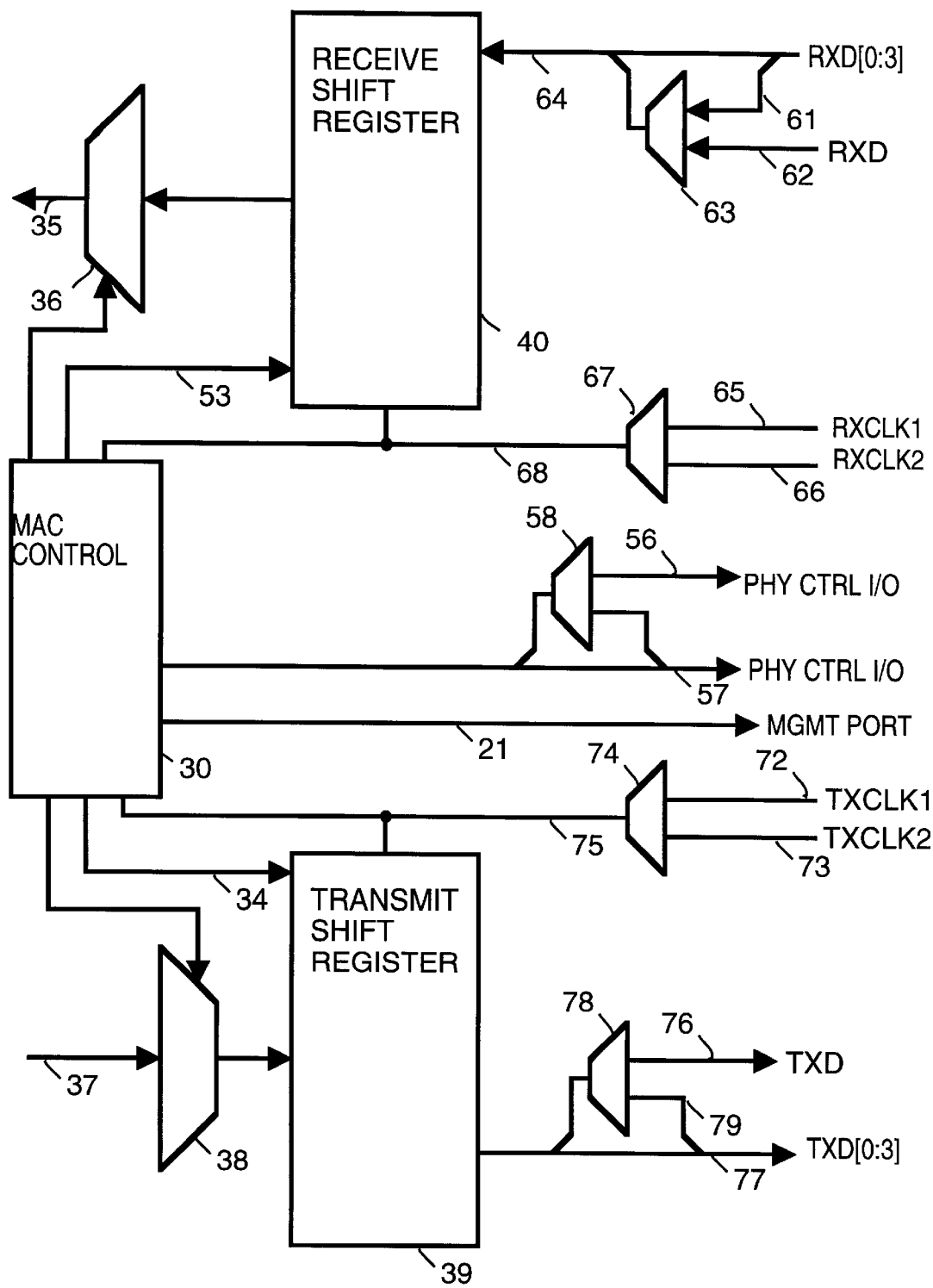
FIG. 3 is a simplified block diagram which shows an interface within the media access control integrated circuit shown in FIG. 1 in accordance with an alternate embodiment of the present invention.

For example, FIG. 3 shows a switch 63, a switch 67, a switch 58, a switch 74 and a switch 78 used to isolate a serial PHY without a power down capability from MAC 11. Lines 64 carry receive data RXD[0:3] from four-bit receive data output 133 of MII PHY 13. Switch 63 selects either RXD[0] from MII PItY 13 on line 61 or RXD from receive data output 123 of serial PHY 12, depending upon whether MAC 11 is communicating with serial PHY 12 or MII PHY 13.

Switch 67 selects either a receive clock signal from serial PHY 12 on receive clock (RXCLK1) line 65 or a receive clock signal from MII PHY 13 on receive clock (RXCLK2) line 66 for the receive clock signal on receive clock line 68.

Lines 57 carry control data for physical control signal I/O lines 135 of MII PHY 13. Switch 58 selects either the subset of physical control signal I/O lines 56 for serial PHY 12 or the corresponding subset of physical control signal I/O lines for MII PHY 13, depending upon whether MAC 11 is communicating with serial PHY 12 or MII PHY 13.

Switch 74 selects either a transmit clock signal from serial PHY 12 on transmit clock (TXCLK1) line 72 or a transmit clock signal from MII PHY 13 on a transmit clock (TXCLK2) line 73 for the transmit clock on transmit clock line 75.

Lines 77 carry transmit data TXD[0:3] to four-bit transmit data input 132 of MIT PHY 13. Switch 78 selects either TXD[O] from MIT PHY 13 on line 79 or TXD from transmit data input 122 of serial PHY 12, depending upon whether MAC 11 is communicating with serial PHY 12 or MII PHY 13.

Figure 4:
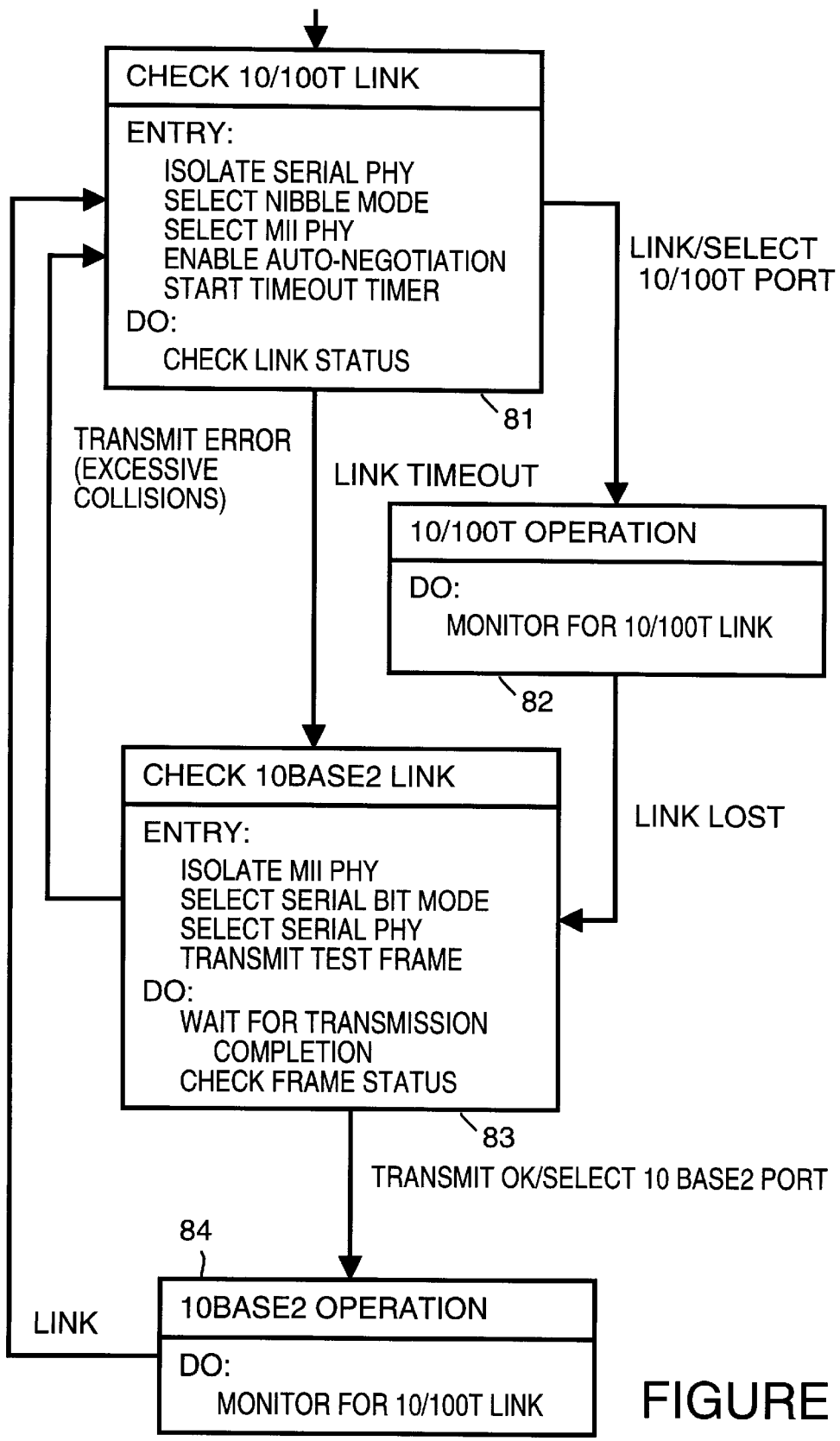
FIG. 4 is a simplified block diagram which shows a state machine for link control logic in accordance with a preferred embodiment of the present invention.

FIG. 4 shows a link control state machine which controls MAC control 30 as well as MII PHY 13 and serial PHY 12. For example the state machine is implemented as firmware executed by a central processor. Alternatively, the link control state machine is implemented in hardware within MAC 11. Upon entering a check 10/100T link state 81, serial PHY 12 is isolated via power down control line 16 (as shown in FIG. 1) or comparable hardware (as shown in FIG. 3). MAC control 30 is then placed into nibble mode. Then MII PHY 13 (used for either 10T or 100T) is selected and auto-negotiation is enabled. This allows MII PHY 13 to establish a 10T or 100T link via interface 15. A link timer is then started to restrict the linking time to a finite period.

While in check 10/100T link state 81, MII PHY 13 is polled to determine whether a link has been established. If a link is established (link/select 10/100T port), then interface 15 is selected and a transition is made to a 10/100T operation state 82. However, if the link timer expires (link timeout) then instead a transition to a check 10Base2 link state 83 is made.

In 10/100T operation state 82, the 10/100T link is monitored. When in 10/100T operation state 82 the link is lost (link lost), 10Base2 link state 83 is entered.

Upon entering check 10Base2 link state 83, MII PHY 13 is isolated via MII management interface 136. MAC control 30 is then placed in the serial mode. Then serial PHY 12 is selected and a test frame is transmitted. The test frame is self-addressed at the MAC level, thereby insuring that another network device will not process it. The test frame is used to determine whether interface 14 (10Base2 port) is connected to a 10Base2 network. Once the test frame has been transmitted, the status of the test frame is checked. If the transmission was successful (i.e., the test frame was sent), then interface 14 is selected and a transition (transmit OK/select 10Base2) is made to a 10Base2 operation state 84. If, however, an error is encountered on the frame transmission, then a transition (transmit error) is made back to check 10/100T link state 81. The error condition in this case is excessive collisions on the transmission.

Since 10Base2 networks must be 50 ohm terminated, a 10Base2 port not connected to a network will encounter reflections during a transmission. These reflections cause MAC 11 to believe that collisions are being encountered on the network. After unsuccessfully transmitting a frame 16 times, Mac 11 gives up and indicates that an excessive collision error has occurred for the frame. While this could be a legitimate error due to heavy traffic on the network, it is unlikely to persist and an active 10Base2 port would be selected.

In the 10Base2 operating state 84, MII PHY 13 is periodically polled to determine whether a link has been established via interface 15 (the 10/100T port). If a link is established, then a transition to check 10/100T link state 81 occurs. In this manner communication using MII PHY 13 (i.e., via the 10/100T port) is given priority over communication using serial PHY 12 (i.e., via the 10Base2 port).

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A link control state machine for controlling a media access controller (MAC), a serial physical sublayer (serial PHY) and a media independent interface physical sublayer (MII PHY), the link control state machine comprising:
    a first state in which link status of the MII PHY is checked;
    a second state in which the MAC performs data transfer using the MII PHY and in which the serial PHY is isolated from the MAC, wherein the second state is entered from the first state when the check of the link status shows that a link is established;
    a third state in which the MII PHY is isolated from the MAC and in which a test frame is sent using the serial PHY, wherein the third state is entered from the first state when there is a link timeout; and
    a fourth state in which the MAC performs data transfer using the serial PHY, wherein the fourth state is entered from the third state when the test frame is transmitted successfully.

2. A link control state machine as in claim 1, wherein in the first state the serial PHY is isolated from the MAC, the MAC is placed into a nibble mode, the MII PHY is selected, auto-negotiation is enabled, and a timeout timer is started.

3. A link control state machine as in claim 1, wherein in the second state a link status of the MII PHY is monitored and when there is a link loss, the link control state machine transitions to the third state.

4. A link control state machine as in claim 1, wherein in the third state, after the test frame is sent, status of the test frame is checked.

5. A link control state machine as in claim 4, wherein in the third state, if there is a transmit error indicated by the status of the test frame, the link control state machine transitions to the first state.

6. A link control state machine as in claim 1, wherein in the fourth state, link status of the MII PHY is checked.

7. A link control state machine as in claim 6, wherein in the fourth state, if a link is established by the MII PHY, the link control state machine transitions to the first state.

8. A method for controlling a media access controller (MAC), a serial physical sublayer (serial PHY) and a media independent interface physical sublayer (MII PHY), the method comprising the following steps:
    (a) entering a first state and checking a link status of the MII PHY;
    (b) in the first state, if the check of the link status shows that a link is established, entering a second state;
    (c) in the second state, performing data transfers using the MII PHY while the serial PHY is isolated from the MAC;

(d) in the first state, entering a third state when there is a link timeout;

(e) in the third state, isolating the MII PHY from the MAC, placing the MAC in a serial mode, and sending a test frame using the serial PHY;

(f) in the third state, entering a fourth state when the test frame is transmitted successfully; and (g) in the fourth state, performing data transfer using the serial PHY.

9. A method as in claim 8, additionally comprising the following steps:

(h) in the first state, isolating the serial PHY from the MAC;

(i) in the first state, putting the MAC into a nibble mode;

(j) in the first state, selecting the MII PHY;

(k) in the first state, enabling auto-negotiation; and (l) in the first state, starting a timeout timer.

10. A method as in claim 8, additionally comprising the following steps:

(h) in the second state, monitoring a link status of the MII PHY; and (i) in the second state, when there is a link loss, entering the third state.

11. A method as in claim 8, additionally comprising the following step:

(h) in the third state, after the test frame is sent, checking status of the test frame.

12. A method as in claim 11, additionally comprising the following step:

(i) in the third state, if there is a transmit error indicated by the status of the test frame, entering the first state.

13. A method as in claim 8, additionally comprising the following step:

(h) in the fourth state, checking link status of the MII PHY.

14. A method as in claim 13, additionally comprising the following step:

(i) in the fourth state, if a link is established by the MII PHY, entering the first state.

15. A method for controlling a media access controller (MAC), a serial physical sublayer (serial PHY) and a media independent interface physical sublayer (MII PHY), the method comprising the following steps:

(a) checking a link status of the MII PHY;

(b) if in step (a), the check of the link status shows that a link is established, performing data transfers using the MII PHY and isolating the serial PHY from the MAC;

(c) if in step (a), there is a link timeout, isolating the MII PHY from the MAC and sending a test frame using the serial PHY; and (d) if in step (c) the test frame is transmitted successfully, performing data transfer using the serial PHY.

16. A method as in claim 15, wherein step (a) includes the following substeps:

(a.1) isolating the serial PHY from the MAC;

(a.2) placing the MAC into a nibble mode;

(a.3) selecting the MII PHY;

(a.4) enabling auto-negotiation; and (a.5) starting a timeout timer.

17. A method as in claim 15, wherein step (c) includes the following substep:

(c.1) isolating the MII PHY from the MAC;

(c.2) placing the MAC into a serial bit mode;

(c.3) selecting the serial PHY;

(c.4) sending a test frame; and, (c.5) after the test frame is sent, checking status of the test frame.

18. A method as in claim 17, wherein step (c) includes the following substep:

(c.6) if there is a transmit error indicated by the status of the test frame, checking a link status of the MII PHY.

19. A method as in claim 15, wherein step (d) includes the following substep:

(d.1) checking link status of the MII PHY; and (d.2) if a link is established by the MII PHY, performing data transfer using the MII PHY.

* * * * *